United States Patent
Parker et al.

(10) Patent No.: US 10,145,410 B2
(45) Date of Patent: Dec. 4, 2018

(54) DUST BOOT FOR A MOVEABLE JOINT

(71) Applicant: Federal-Mogul Products, Inc., Southfield, MI (US)

(72) Inventors: Glen C. Parker, Saint Peters, MO (US); Roger Sellers, Arnold, MO (US); Peter Rauch, St. Peters, MO (US); Thomas Byrnes, St. Charles, MO (US)

(73) Assignee: Federal-Mogul Products, Inc., Southfield, MI (US)

( * ) Notice: Subject to any disclaimer, the term of this patent is extended or adjusted under 35 U.S.C. 154(b) by 383 days.

(21) Appl. No.: 14/339,282

(22) Filed: Jul. 23, 2014

(65) Prior Publication Data
US 2016/0025129 A1   Jan. 28, 2016

(51) Int. Cl.
*F16C 11/06* (2006.01)
*F16J 15/52* (2006.01)
*F16J 3/04* (2006.01)

(52) U.S. Cl.
CPC .......... *F16C 11/06* (2013.01); *F16C 11/0671* (2013.01); *F16C 11/0685* (2013.01);
(Continued)

(58) Field of Classification Search
CPC .............. F16C 11/0666; F16C 11/0677; F16C 11/0628; F16C 11/06; F16C 11/0671; F16C 11/0685; F16C 11/0682; F16C 2326/24; F16J 3/042; F16J 15/52; Y10T 403/32196; Y10T 403/32311; Y10T 403/32565; Y10T 403/32573; Y10T 403/32631; Y10T 403/32639; Y10T 403/32647; Y10T 403/32655; Y10T 403/32663;
(Continued)

(56) References Cited

U.S. PATENT DOCUMENTS 3,024,050 A   3/1962   Moskovitz
3,027,182 A   3/1962   Reuter
(Continued)

FOREIGN PATENT DOCUMENTS

DE   2445105 A1   4/1975
DE   10314902 A1 *  10/2004   .......... F16C 11/0633
(Continued)

OTHER PUBLICATIONS

International Search Report, dated Oct. 1, 2015 (PCT/US2015/036871).

*Primary Examiner* — Matthieu F Setliff
(74) *Attorney, Agent, or Firm* — Robert L. Stearns; Dickinson Wright, PLLC

(57) ABSTRACT

The assembly includes a housing with an inner bore that extends along an axis. A stud is at least partially disposed in the inner bore of the housing and is pivotable relative to the housing. A top edge of the housing is bent radially inwardly to present a flange. A two-piece dust boot is provided including a cover piece of an elastic material and a spring washer. The cover piece extends from a first end portion that is sealed against the housing to a second end portion that is sealed against the stud. The spring washer is at least substantially encapsulated within the cover piece at the first end portion and biases the cover piece against the flange of the housing to establish a seal that is resistant to compression setting between the cover piece and the housing.

13 Claims, 3 Drawing Sheets

(52) U.S. Cl.
CPC ............... *F16J 3/042* (2013.01); *F16J 15/52* (2013.01); *F16C 11/0628* (2013.01); *F16C 2326/24* (2013.01)

(58) Field of Classification Search
CPC ..... Y10T 403/32672; Y10T 403/32681; Y10T 403/32688; Y10T 403/32696; Y10T 403/32704; Y10T 403/32713; Y10T 403/32721; Y10T 403/31; Y10T 403/315
See application file for complete search history.

(56) References Cited

U.S. PATENT DOCUMENTS

| | | | |
|---|---|---|---|
| 3,147,537 A | 9/1964 | Fadow | |
| 3,175,834 A | 3/1965 | Wallace et al. | |
| 3,225,420 A | 12/1965 | Sullivan, Jr. | |
| 3,262,706 A | 7/1966 | Hassan | |
| 3,284,115 A | 11/1966 | Schmidt | |
| 3,292,957 A | 12/1966 | Ulderup | |
| 3,322,445 A | 5/1967 | Hassan | |
| 3,378,287 A * | 4/1968 | Ulderup | B62D 7/16 384/138 |
| 3,384,397 A * | 5/1968 | Wehner | F16C 11/0647 403/140 |
| 3,389,927 A * | 6/1968 | Herbenar | F16C 11/0633 403/128 |
| 3,476,417 A | 11/1969 | Born et al. | |
| 3,901,518 A | 8/1975 | Uchida | |
| 4,121,844 A * | 10/1978 | Nemoto | F16C 11/0671 277/635 |
| 4,322,175 A | 3/1982 | Szczesny | |
| 4,856,795 A | 8/1989 | DeLano et al. | |
| 5,649,779 A | 7/1997 | Martin et al. | |
| 6,010,271 A * | 1/2000 | Jackson | F16C 11/0628 403/131 |
| 2005/0111907 A1 | 5/2005 | Urbach | |
| 2006/0171775 A1 | 8/2006 | McLaughlin et al. | |

FOREIGN PATENT DOCUMENTS

| | | |
|---|---|---|
| DE | 10314902 A1 | 10/2004 |
| DE | 102004014774 A1 | 12/2005 |
| JP | H01193405 A | 8/1989 |
| JP | H01203712 A | 8/1989 |

* cited by examiner

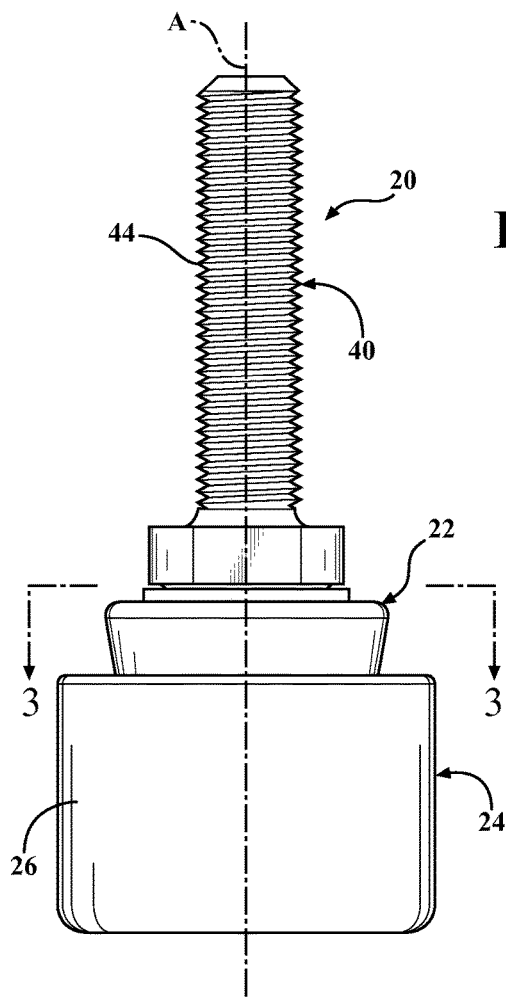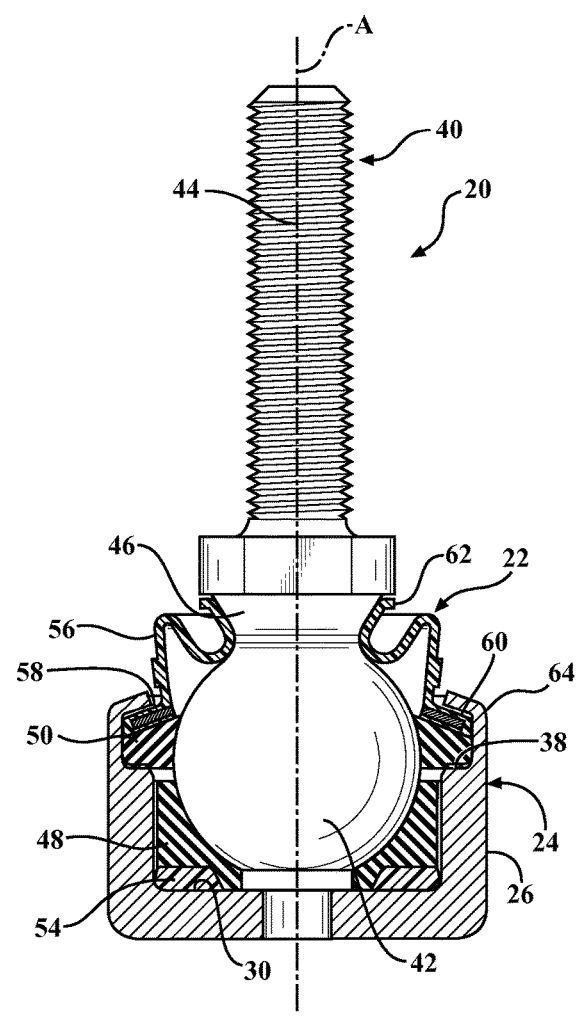

DUST BOOT FOR A MOVEABLE JOINT

BACKGROUND OF THE INVENTION

1. Field of the Invention

The present invention is related to dust boots for establishing contaminant blocking and lubricant retaining seal between a housing and a stud of a moveable joint.

2. Related Art

Dust boots made of rubber or other similar materials are often used on moveable ball socket joints to seal the socket by preventing contaminants from entering the socket and to prevent lubricants from escaping the socket. Such sockets typically include a housing and a stud which are pivotable relative to one through a wide range of motion. The dust boot must maintain seals with both the housing and the stud through the full range of motion of the housing and stud relative to one another. Often, metal or plastic rings are placed externally and around the outside circumference of the dust boot or are inserted within the dust boot adjacent opposite ends of the dust boot for biasing the dust boot against the stud and housing to establish the seals therebetween. The processes of manufacturing such types of moveable joints is often very labor intensive due to the large number of parts. Additionally, on occasion, the dust boot may be unintentionally torn during the manufacturing process, which leads to unnecessary waste and labor to replace the torn part. The use of external rings may also require the outer circumference of the housing to be machined so as to provide a surface configuration that is sufficient for capturing the dust boot and producing an acceptable seal.

Another option for establishing the seal between the dust boot and the housing is to capture an end of the dust boot under a crimped or spun edge of the housing. In this option, a metal or plastic ring may additionally be placed within the dust boot to restrict unintentional pull out of the dust boot from the crimp or spun edge during full articulation of the stud and housing relative to one another. However, this option may also have certain limitations. For example, the crimping or spinning process may fail to produce an adequate seal between the dust boot and the housing. Additionally, due to the mechanical properties of common dust boot materials, the dust boot may take a "compression set" after a certain amount of time and pressure, thereby weakening the seal between the dust boot and the housing. Overspinning or over crimping the housing onto the dust boot does not compensate for the possible "compression set" condition and may force some of the material of the dust boot to vacate the area between the mating surfaces.

SUMMARY OF THE INVENTION

One aspect of the present invention provides for a dust boot for a moveable joint having a housing and a stud. The dust boot includes a cover piece which is made of an elastic material and extends from a first end portion for sealing against the housing of the moveable joint to a second end portion for sealing against the stud of the moveable joint. A spring washer is at least substantially encapsulated within the elastic cover piece at the first end portion for biasing the elastic cover piece against the housing. The dust boot according to this aspect of the present invention is advantageous because it is capable of establishing a contaminant and fluid tight seal between the cover piece and the housing which is resistant to both pull out during articulation of the stud relative to the housing and to compression setting by the cover piece. This is accomplished without the need for an external crimping ring or any other similar component, which leads to additional manufacturing and cost savings advantages.

Another aspect of the present invention provides for a moveable joint assembly. The moveable joint assembly includes a housing with an inner bore which extends along an axis and a top edge which is bent radially inwardly to present a flange. A stud is at least partially disposed in the inner bore of the housing and is pivotal relative to the housing. The top edge of the housing is bent radially inwardly to present a flange. The moveable joint assembly further includes a dust boot with a cover piece and a spring washer. The cover piece is made of an elastic material and extends from a first end portion that is sealed against the housing to a second end portion that is sealed against the stud. The spring washer is at least substantially encapsulated within the elastic cover piece at the first end portion and biases the first end portion of the elastic cover piece against the flange of the housing.

A further aspect of the present invention provides for a method of making a moveable joint. The method includes the step of preparing a housing including a top edge and an inner bore that extends along an axis. The method continues with the step of positioning at least one bearing in the inner bore of the housing. The method proceeds with the step of positioning a stud at least partially in the inner bore of the housing. The method continues with the step of preparing a dust boot including a cover piece which extends from a first end portion to a second end portion and which has a washer spring that is at least substantially encapsulated within the first end portion. The method proceeds with the step of positioning the first end portion of the cover within the inner bore of the housing. The method continues with the step of bending the top edge of the housing radially inwardly to present a flange so that the washer spring biases the first end portion of the cover piece against the flange of the housing for sealing the cover piece against the housing. This process is advantageous because a durable seal is established between the dust boot and the housing without any machining steps or external crimping rings or other similar components.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 2 is a front view of the socket assembly of FIG. 1;

FIG. 3 is a cross-sectional view of the socket assembly of FIG. 1 taken through line 3-3 of FIG. 2;

DESCRIPTION OF THE ENABLING EMBODIMENT

Figure 1:
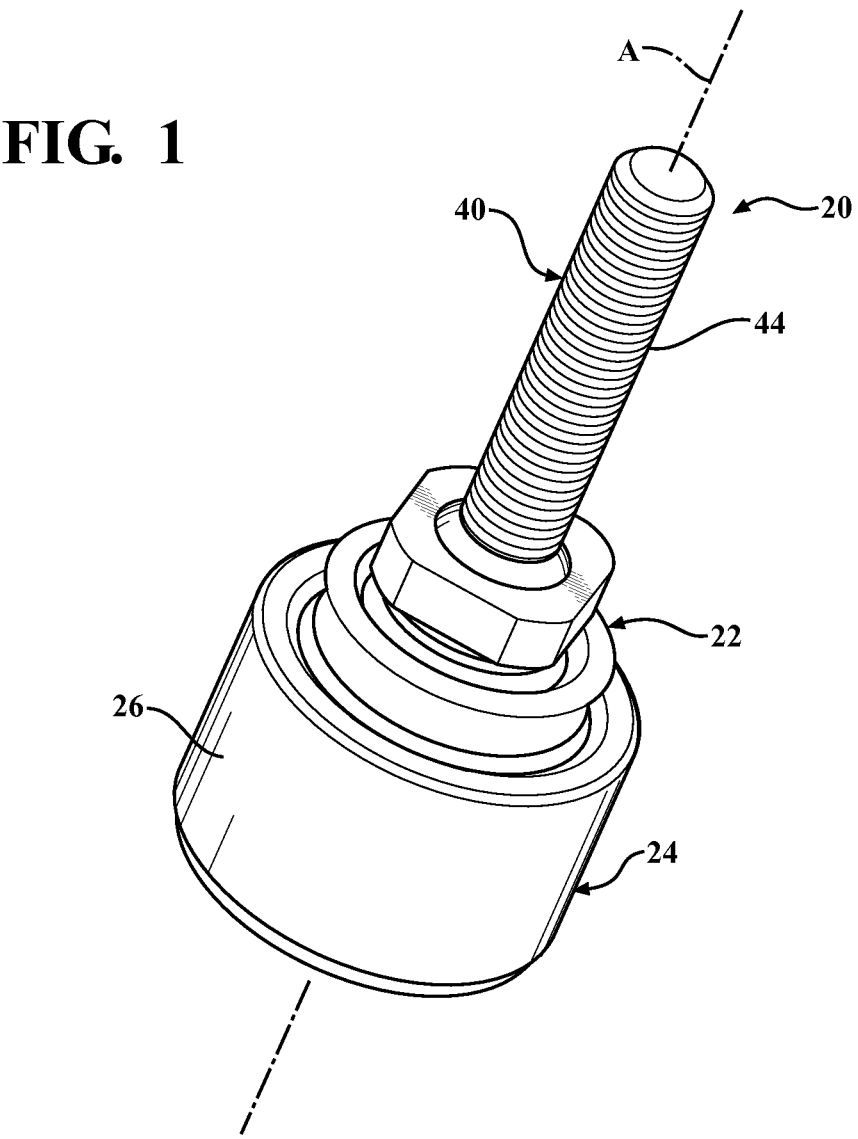
FIG. 1 is a perspective view of an exemplary embodiment of a socket assembly.

Referring to the Figures, wherein like numerals indicate corresponding parts throughout the several views, an exemplary embodiment of a socket assembly 20, or a moveable joint assembly, is generally shown in FIG. 1. The socket assembly 20 includes an improved dust boot 22, sometimes also known as a dust cover, for establishing a contaminant and fluid tight seal for keeping contaminants out of the interior of the socket assembly 20 and also keeping grease, or any other lubricant, inside the interior of the socket assembly 20. The improved dust boot 22 is adapted to be installed in the socket assembly 20 more easily than other known dust boots and without any external crimp rings or similar components that are commonly found in other known socket assemblies. The socket assembly 20 with the improved dust boot 22 may find uses in a range of applications including, for example, ball joints, sway bar links and tie rods of automobile steering mechanisms.

Figure 4:
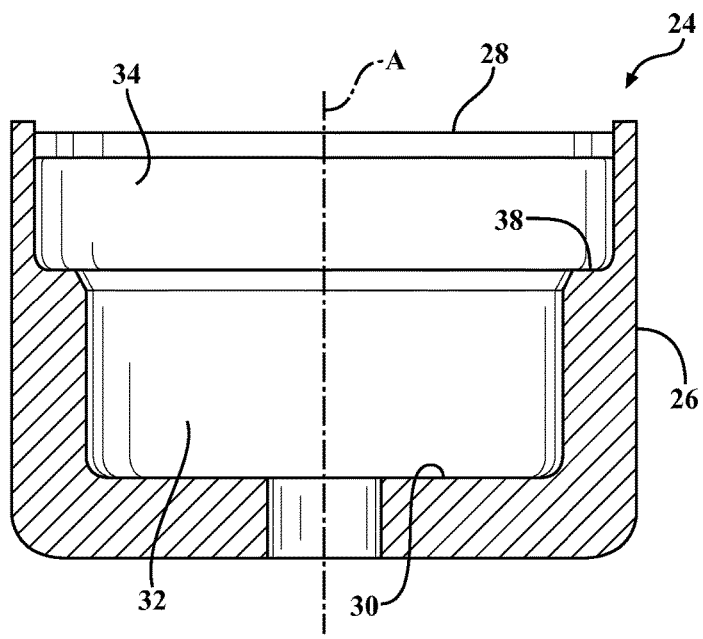
FIG. 4 is a cross-sectional view of a housing of the socket assembly of FIG. 1.

Referring to FIGS. 3 and 4, the socket assembly 20 includes a housing 24 with an external surface 26, which is generally cylindrical in shape, and an inner bore which extends along an axis A. The external surface 26 may be integrally formed with another component (such as a tie rod of a vehicle steering system), may be adapted to be received within an opening in another component (such as a control arm of a vehicle suspension system) or may be adapted to be joined with another component through any suitable means. In the exemplary embodiment, the housing 24 presents an inner wall which extends axially from an open upper end 28 to a closed lower end 30. The closed lower end 30 has a lubrication opening for introducing a lubricant into the inner bore. The housing 24 is preferably made of metal, such as steel. However, any suitable material may be employed.

With reference to FIG. 4, the inner bore of the exemplary housing 24 has a lower area 32, which is adjacent to the closed lower end 30, and an upper area 34, which is adjacent the open upper end 28. The lower area 32 of the inner bore has a first radius, and the upper area 34 of the inner bore has a second radius that is larger than the first radius, i.e., the upper portion is diametrically larger than the lower portion 32. The inner wall of the housing 24 presents a shoulder 38 which separates the lower and upper areas 32, 34 and which faces towards the open upper end 28 of the housing 24.

Referring back to FIG. 3, a stud 40 is at least partially positioned within the inner bore of the housing 24 and is pivotable relative thereto. In the exemplary embodiment, the stud 40 includes a generally spherically-shaped head portion 42 and an elongated and generally cylindrical shank portion 44, which is configured for attachment to a second vehicle component, such as a steering knuckle of a vehicle steering system. Between the spherical head portion 42 and the cylindrical shank portion 44, the stud 40 includes a tapered portion 46 which tapers radially outwardly away from the spherical head portion 42 to a radially extending ledge which separates the tapered portion 46 from the cylindrical shank portion 44. The stud 40 is preferably made of metal, such as steel. However, any suitable material may be employed.

In the exemplary embodiment of the socket assembly 20, a pair of bearings 48, 50 are positioned in the inner bore of the housing 24 to facilitate the pivoting or articulating movement between the stud 40 and housing 24. Each of the bearings 48, 50 has an inner hemispherical surface for rotatably supporting the spherical head portion 42 of the stud 40 to facilitate the relative pivoting movement between the stud 40 and the housing 24. More precisely, the exemplary socket assembly 20 includes a lower bearing 48, which is positioned in the lower portion 36 of the inner bore, and an upper bearing 50, which is positioned in the upper portion of the inner bore. The upper bearing 50 is positioned within the upper portion of the inner bore and abuts the shoulder 38 of the inner wall. The upper bearing 50 also has a generally flat top surface which faces towards the upper second end 28 (shown in FIG. 4) of the housing 24.

In the exemplary embodiment of the socket assembly 20, a preloaded member 54, such as an O-ring or a spring washer, of a predetermined thickness is sandwiched between the closed lower end 30 of the housing 24 and the lower bearing 48 within the lower portion 36 of the inner bore. The spacer 54 has an annular shape to allow for grease to pass from the lubrication passage in the closed lower end 30 of the housing 24 to lubricate the contact surfaces between the spherical head portion 42 of the stud 40 and the inner hemispherical surfaces of the upper and lower bearings 50, 48.

Figure 5:
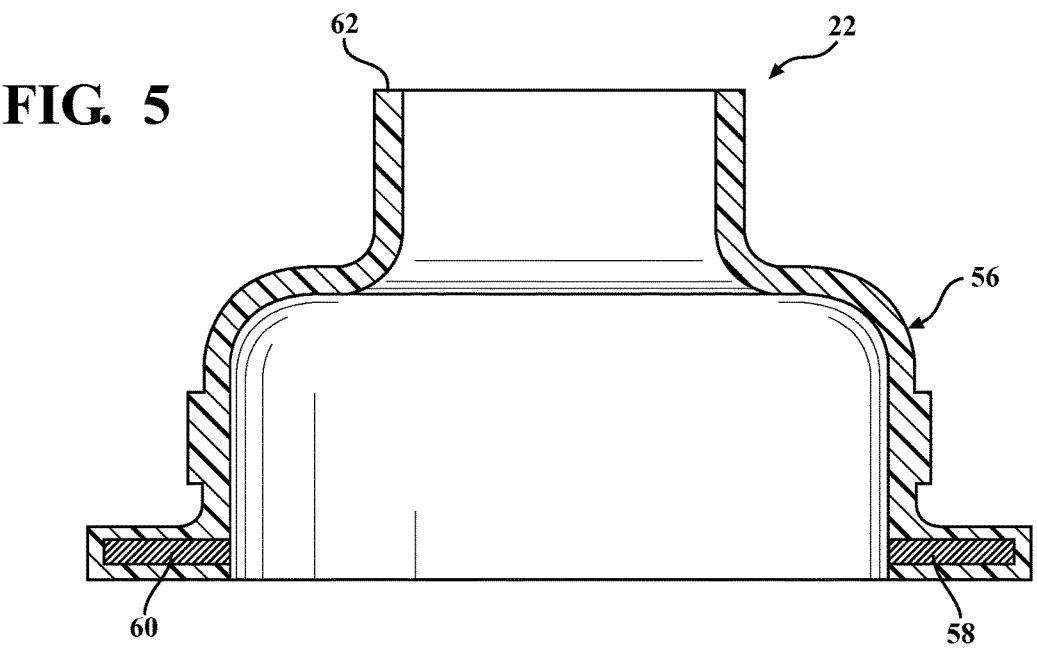
FIG. 5 is a cross-sectional view of a dust boot of the socket assembly of FIG. 1.

The dust boot 22 is sealed against the housing 24 and against the stud 40 to restrict debris or other contaminants from accessing the inner bore of the housing 24 and to also keep grease or any other lubrication within the inner bore of the housing 24. As shown in FIGS. 3 and 5, the dust boot 22 is of two pieces, including a cover piece 56 and a spring washer 58. The cover piece 56 is made of an elastic material, such as rubber, and extends from a first end portion 60 that is sealed against the housing 24 to a second end portion 62 that is sealed against the stud 40. The elasticity or flexibility of the cover piece 56 allows it to stretch and maintain the seals with the housing 24 and stud 40 during the pivoting or articulating movement of the stud 40 and housing 24 relative to one another during use of the socket assembly 20.

In the exemplary embodiment of the socket assembly 20, a top edge of the housing 24 is bent, crimped or spun radially inwardly to present a flange 64 which engages the first end portion 60 of the cover piece 56. Specifically, after the crimping, spinning or bending, the first end portion 60 of the cover piece 56 is sandwiched between the flange 64 of the housing 24 and the flat or conically shaped top surface of the upper bearing 50. This allows the cover piece 56 to stretch through the full limits of the pivoting or articulating movement of the stud 40 relative to the housing 24 without breaking the seal between the cover piece 56 and the housing 24.

The dust boot 22 further includes a spring washer 58, which is at least mostly or substantially encapsulated within the first end portion 60 of the cover piece 56. The spring washer may be, for example, a cone-shaped Belleville type washer or a flat spring washer that is formed into a conical shape in the assembly. The later is shown in the exemplary embodiments. The spring washer 58 may have any suitable orientation within the first end portion 60 of the cover piece 56. For example, the spring washer 58 may be oriented such that the inner diameter biases the first end portion 60 of the cover piece 56 against the flange 64 of the housing 24 and the outer diameter of the spring washer 58 biases the first end portion 60 of the cover piece 56 against the top surface of the upper bearing 50 or vice versa. As such, the seal between the cover piece 56 and the flange 64 of the housing 24 extends continuously through three hundred and sixty degrees (360°) around the axis A.

In operation, the spring washer 58 biases the cover piece 56 into a sealing engagement with the housing 24 that is resistant to compression sets that are common in other known dust boots. Additionally, the spring washer 58 biases the outermost radial end of the first end portion 60 of the cover piece 56 in a radial direction against the inner wall of the housing 24 to further improve the seal between the cover piece 56 and the housing 24. The spring washer 58 may be encapsulated within the cover piece 56 through an overmolding process.

The second end portion 62 of the cover piece 56 of the dust boot 22 is sealed along substantially the entire length of the tapered portion 46 of the stud 40. This allows for an effective seal to be maintained between the stud 40 and the dust boot 22 through the full range of articulating movement between the stud 40 and the housing 24 without any external crimping rings or other similar components that are commonly found on other known dust boots.

Manufacturing of the socket assembly 20 involves placing the preloaded member 54, bearings 48, 50 and head portion 42 of the stud 40 in the inner bore of the housing 24 then engaging the first end portion 60 of the cover piece 56 against the top surface of the upper bearing 50. Next, the top edge is bent, for example through crimping or spinning, to present a flange 64. The washer spring biases the first end portion 60 of the cover piece 56 against the flange 64 to establish the seal therebetween.

Obviously, many modifications and variations of the present invention are possible in light of the above teachings and may be practiced otherwise than as specifically described while within the scope of the appended claims.

What is claimed is:

1. A moveable joint assembly, comprising:
   a housing having an inner bore extending along an axis and having a top edge;
   a stud at least partially disposed in said inner bore of said housing and being pivotal relative to said housing;
   a dust boot including a cover piece of an elastic material extending from a first end portion to a second end portion, said first end portion being sealed against said housing, and said second end portion being sealed against said stud;
   said top edge of said housing being bent radially inwardly to capture said first end portion of said dust boot in said inner bore of said housing; and
   said dust boot further including a frusto-conically shaped spring washer embedded within said first end portion of said elastic cover piece and being deformed to bias said elastic material of said cover piece against said housing while said spring washer remains out of contact with said housing to establish a seal between said cover piece and said housing that is resistant to compression setting.

2. The moveable joint as set forth in claim 1 wherein said stud has a spherical head portion and a shank portion.

3. The moveable joint as set forth in claim 2 further including an upper bearing positioned in said inner bore of said housing and having an inner hemispherical surface in sliding contact with said spherical head portion of said stud.

4. The moveable joint as set forth in claim 3 further including a lower bearing positioned in said inner bore of said housing and having an inner hemispherical surface in sliding contact with said spherical head portion of said stud.

5. The moveable joint as set forth in claim 4 wherein said housing has a closed lower end and an open upper end.

6. The moveable joint as set forth in claim 5 wherein said inner bore of said housing has a lower area with a first radius adjacent said closed lower and an upper area with a second radius adjacent said open upper end and wherein said second radius of said upper area is greater than said first radius of said lower area.

7. The moveable joint as set forth in claim 3 wherein said spring washer biases said first end portion of said cover piece against a top surface of said upper bearing.

8. The moveable joint as set forth in claim 7 wherein one of an outer diameter or an inner diameter of said spring washer biases said first end portion of said cover piece against said radially inwardly bent top edge of said housing and wherein the other of the outer diameter and the inner diameter of said spring washer biases said first end portion of said cover piece against said top surface of said upper bearing.

9. The moveable joint as set forth in claim 2 wherein said second end portion of said cover piece is sealed against said shank portion of said stud.

10. The moveable joint assembly as set forth in claim 1 wherein said frusto-conically shaped spring washer is overmolded into engagement with said cover piece.

11. A method of making a moveable joint, comprising the steps of:
    preparing a housing including a top edge and an inner bore that extends along an axis;
    positioning at least one bearing in the inner bore of the housing;
    positioning a stud at least partially in the inner bore of the housing;
    preparing a dust boot including a cover piece which is made of an elastic material and which extends from a first end portion to a second end portion and including a frusto-conically shaped washer spring which is embedded within the first end portion of the cover piece;
    positioning the first end portion of the cover piece within the inner bore of the housing;
    bending the top edge of the housing radially inwardly to present a flange that captures the washer spring in the inner bore of the housing; and
    deforming the washer spring to bias the elastic material of the first end portion of the cover piece against the flange to establish a seal between the cover piece and the housing that is resistant to compression setting while keeping the washer spring out of contact with the housing.

12. The method as set forth in claim 11 wherein the stud has a generally spherical head portion and a cylindrical shank portion and a tapered portion between said head and shank portions.

13. The method as set forth in claim 11 further including the step of overmolding the cover piece onto the washer spring to embed the washer spring within the first end portion of the cover piece.

* * * * *